Figure 1:
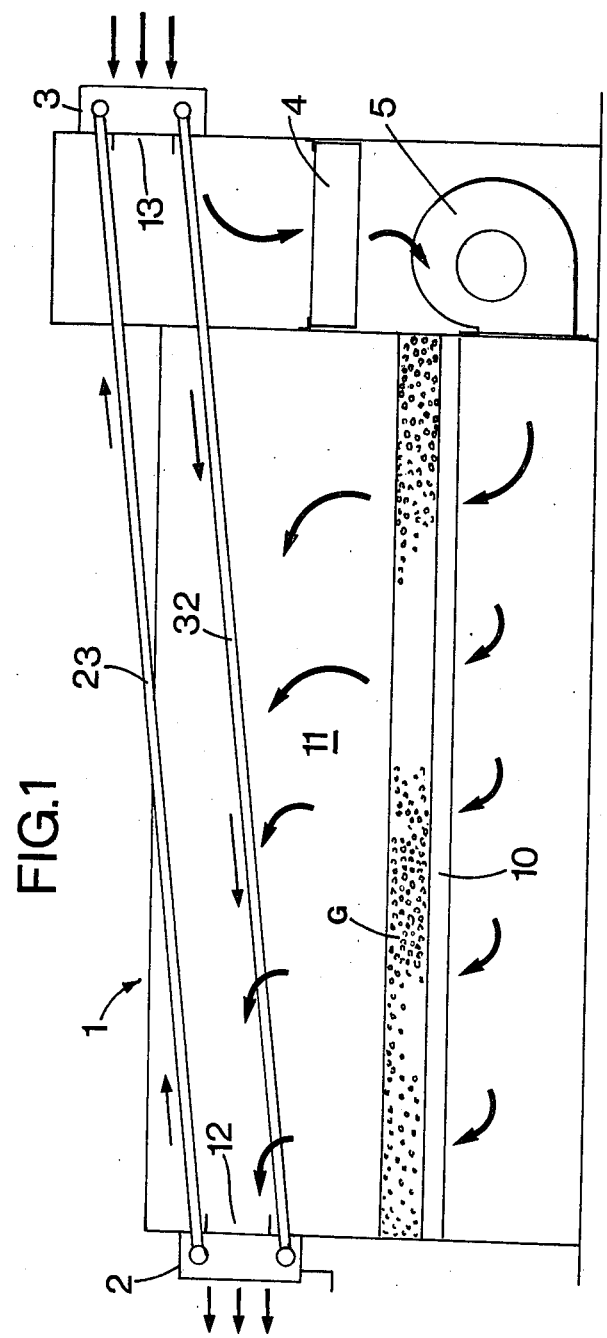

United States Patent [19]

Leigh

[11] 4,091,547
[45] May 30, 1978

[54] HEAT RECOVERY MEANS FOR DRYING APPARATUS

[75] Inventor: Barry Rupert Leigh, Rugby, England

[73] Assignee: Josglade Limited, Coventry, England

[21] Appl. No.: 782,290

[22] Filed: Mar. 28, 1977

[30] Foreign Application Priority Data

Mar. 31, 1976 United Kingdom ............... 12944/76

[51] Int. Cl.² ............................................. F26B 19/00
[52] U.S. Cl. ........................................ 34/86; 165/108
[58] Field of Search ....................... 34/86, 43; 165/108

[56] References Cited

U.S. PATENT DOCUMENTS

| | | | |
|---|---|---|---|
| 2,743,529 | 5/1956 | Hayes | 34/86 X |
| 2,775,823 | 1/1957 | Cremer et al. | 34/86 X |
| 3,931,683 | 1/1976 | Crites et al. | 34/86 X |

Primary Examiner—Edgar W. Geoghegan
Attorney, Agent, or Firm—Watson, Cole, Grindle & Watson

[57] ABSTRACT

Heat recovery means in drying apparatus such as a kiln consists of a heat exchanger located at the moist air outlet of the chamber of the drying apparatus for contact with exhaust moist air therefrom and a further heat exchanger located at the air inlet to the drying apparatus for contact of incoming air therewith, the heat exchangers being connected in circuit by pipework for the circulation of refrigerant between them in conveying heat energy by vaporized refrigerant from the heat exchanger located at the moist air outlet to that located at the inlet for transfer of said heat energy on condensation of the refrigerant to air entering the inlet.

6 Claims, 3 Drawing Figures

HEAT RECOVERY MEANS FOR DRYING APPARATUS

This invention has reference to drying apparatus such as a kiln of the kind through which heated air is passed as the drying agent and the object of the invention is to provide heat recovery means whereby heat loss to atmosphere from the apparatus or kiln is minimised with consequent improvement in the economic operation of the apparatus or kiln. This and other practical advantages will be apparent from the following disclosure.

According to this invention heat recovery means in or for drying apparatus such as a kiln of the kind referred to is characterised by a heat exchanger which in use is located at the moist air outlet of the drying apparatus for contact with exhaust moist air therefrom and a further heat exchanger which in use is located at the air inlet to the drying apparatus for contact of incoming air therewith, the heat exchangers being connected in circuit by pipework for the circulation of a refrigerant between them in conveying heat energy by vaporised refrigerant from the heat exchanger located at the said outlet to that located at the inlet for transfer of said heat energy on condensation of the refrigerant to air entering the inlet.

The fluid medium for circulation between the heat exchangers consists of a suitable refrigerant and whereas the heating agent normally consists of air, the heat recovery means is also applicable where other gas may be used for the purpose such as an inert gas in which case the term "air" used herein includes such a gas. The term "connecting pipework" includes any suitable passageway means for circulatory flow of refrigerant.

Figure 2:
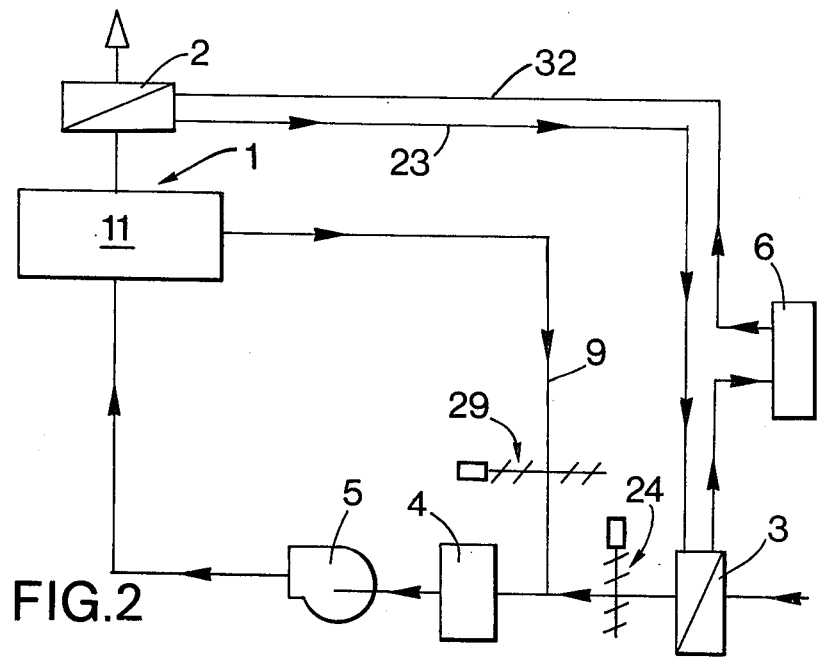
Figure 3:
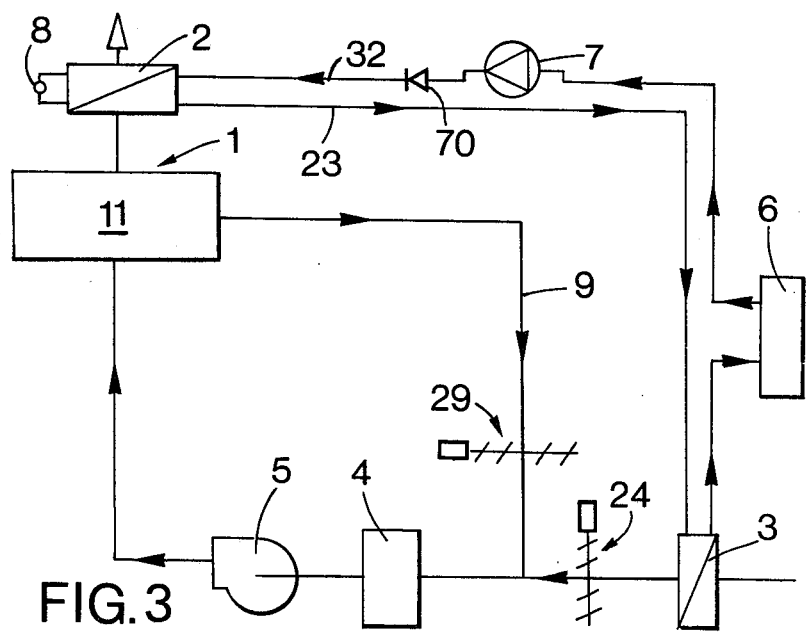

In the practical application of the invention to a kiln for drying grain (e.g. barley) the procedure is as follows, reference being had to the accompanying drawings in which:

FIG. 1 is a diagrammatic elevation of the kiln provided with heat recovery means according to this invention, and FIGS. 2 and 3 are diagrams of the heat recovery means, FIG. 3 showing a modification.

The chamber 11 of the kiln 1 contains a bed 10 for supporting a quantity of grain G to be dried, and heated air e.g. from gas or oil fired heating means 4 (FIG. 2), is introduced under the bed 10 in the kiln chamber 11 by an electric motor driven air pump or fan 5 e.g. of the centrifugal type. The heating means 4 may be situated before the fan 5 (as shown) or after the latter in relation to the direction of air flow through the fan 5. The heated air passes upwardly through the bed 10 and grain G taking up moisture from the latter and thus changing the state of the air. This change in state is an adiabatic cooling process whereby the dry bulb temperature of the air stream falls and the absolute humidity increases so that the enthalpy of the air remains constant.

Hitherto and after passage through the grain G, the normal practice has been to discharge the warm moist air to atmosphere but, for the purpose of this invention, the exhaust air passes from the kiln chamber outlet 12 through a heat exchanger 2 serving as a heat recovery exchanger or coil i.e. the exhaust air passes over the extended heat contact surfaces of the heat exchanger 2 as provided by the usual tubular and gill plate construction of the latter. As a result of a substantial quantity of heat energy is extracted from the warm and moist exhaust air prior to its passing into the atmosphere so that heat loss to the latter is minimised.

Refrigerant within the tubing or coil of the heat recovery exchanger 2 is evaporated by heat from the exhaust air which heat is absorbed as the latent heat of vaporisation of the refrigerant, the vaporised refrigerant then flowing along insulated pipework 23 to a heat return exchanger or coil 3 located at the cold fresh air inlet or intake 13 to the kiln chamber 11 i.e. via the main air heating means 4 and fan 5. In this heat exchanger 3 the vaporised refrigerant condenses so that the exchanger 3 absorbs the latent heat of condensation which is transferred by the extended contact surface area of the latter to the incoming air thus raising the temperature of the latter. The incoming fresh air heated in this way passes to the main air heating means 4 of the kiln 1 where the air is heated to the required operating temperature prior to being driven under the kiln bed 10 by the centrifugal fan 5. As will be appreciated the heat energy required to raise the already heated incoming air to the operating temperature is reduced with consequent economy in the consumption of fuel and overall operation of the kiln.

Return flow of liquid refrigerant from the heat return exchanger 3 to the heat recovery exchanger 2 takes place along the pipework 32 so that a continuous circulation of the refrigerant is maintained between the heat exchangers 2, 3 during operation of the kiln 1. The return pipework 32 is shown including a liquid refrigerant receiver or reservoir 6.

Any suitable refrigerant may be employed such as that known as refrigerant "R11" or "R12" (i.e. as per the official designation of the American Society of Refrigeration Engineers,) or in appropriate instances it may consist of ammonia (Refrigerant R717). The circulatory system viz: the heat exchangers 2, 3 and pipework 23, 32 is evacuated prior to being charged with the necessary quantity of refrigerant. Under operating conditions the arrangement is such that the heat recovery exchanger 2 is maintained substantially full of refrigerant in the liquid state.

It is to be understood that the heat exchangers 2, 3 may be of generally similar construction whilst two or more inter-connected heat exchangers may be provided at the fresh air intake and at the exhaust outlet of the kiln chamber 11 e.g. in relation to corresponding intake or outlet openings and according to requirements, the plurality of heat exchangers provided in this way operating in the same manner as the pair of heat exchangers 2, 3 herein described and shown in the drawings.

In the arrangement shown in FIGS. 1 and 2 i.e. wherein the heat return exchanger 3 is situated at a higher position than the heat recovery exchanger 2, the circulation of refrigerant along the pipework 23, 32 between the heat exchangers 2, 3 is self motivating in an automatic manner. However, where the installation conditions are such that the heat return exchanger 3 cannot be located in a higher position relative to the heat recovery exchanger 2, the pipework system 23, 32 includes in addition to a refrigerant receiver or reservoir 6 a re-circulating pump 7 and non-return valve 70 (see FIG. 3) for one way return flow of condensed refrigerant to the heat recovery exchanger 2. Operation of electric motor drive to this pump may be controlled by switch means 8 responsive to liquid refrigerant level in the heat recovery exchanger 2. The switch 8 may be float operated or consist of a pair of level detectors.

Control of heated air admission to that part of the kiln chamber 11 under the grain bed 10 and also for some return air flow at 9 from the kiln chamber 11 to the inlet side of the centrifugal fan 5 is controlled as required such as by motorised dampers indicated at 24, 29 i.e. in the usual manner or by any other suitable arrangement.

In addition to the heat conservation and fuel economy obtainable by the heat recovery means, the latter i.e. the heat exchangers 2, 3 and inter-connecting external pipework 23, 32 are readily adaptable to particular drying installations in a versatile manner.

I claim:

1. Heat recovery means in combination with drying apparatus such as kiln comprising a chamber for receiving supported therein material such as grain to be dried and having an inlet for air and an outlet for moist air; means for heating and introducing air into the chamber; a heat exchanger located at the moist air outlet of the chamber for contact with exhaust moist air therefrom; a further heat exchanger located at the air inlet for contact of incoming air therewith; and pipework connecting said heat exchangers in circuit for the circulation of a refrigerant between said heat exchangers in conveying heat energy by vaporised refrigerant from the heat exchanger located at said outlet to that located at the inlet for transfer of said heat energy on condensation of the refrigerant to air entering the inlet.

2. Heat recovery means in combination with drying apparatus according to claim 1 wherein the heat exchanger which is located at the moist air outlet of the chamber is situated at a lower position to that of the further heat exchanger which is located at the air inlet of the chamber in order to cause self motivating circulation of refrigerant along the connecting pipework between the heat exchangers.

3. Heat recovery means in combination with drying apparatus according to claim 1 wherein at least one receiver for liquid refrigerant is interconnected by the said connecting pipework with the heat exchangers.

4. Heat recovery means in combination with drying apparatus according to claim 1 wherein a pump is interconnected by the said connecting pipework with the heat exchangers for at least assisting the circulation of refrigerant along said connecting pipework between the heat exchangers.

5. Heat recovery means in combination with drying apparatus according to claim 4 wherein the pump is arranged to effect one way return flow of condensed refrigerant via a non-return valve to the heat exchanger which is located at the moist air outlet of the chamber.

6. Heat recovery means in combination with drying apparatus according to claim 4 wherein electric motor drive to the pump is controlled by switch means responsive to the level of liquid refrigerant in the heat exchanger located at the moist air outlet of the chamber.

* * * * *